(12) United States Patent
Selvaraj et al.

(10) Patent No.: US 11,824,738 B2
(45) Date of Patent: *Nov. 21, 2023

(54) NETWORK TRAFFIC FLOODING FOR UNKNOWN DATA-LINK TO TRANSPORT MAPPING SCENARIOS

(71) Applicant: Arista Networks, Inc., Santa Clara, CA (US)

(72) Inventors: Satish Kumar Selvaraj, San Jose, CA (US); Sriram Chidambaram, Sunnyvale, CA (US); Jian Zhen, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,141

(22) Filed: May 24, 2022

(65) Prior Publication Data
US 2022/0353159 A1 Nov. 3, 2022

Related U.S. Application Data

(63) Continuation of application No. 16/912,662, filed on Jun. 25, 2020, now Pat. No. 11,374,834.

(51) Int. Cl.
| | |
|---|---|
| *H04L 43/026* | (2022.01) |
| *H04L 47/2441* | (2022.01) |
| *H04L 45/748* | (2022.01) |
| *H04L 49/00* | (2022.01) |
| *H04L 45/24* | (2022.01) |
| *H04L 12/46* | (2006.01) |
| *H04L 101/622* | (2022.01) |

(52) U.S. Cl.
CPC ........ *H04L 43/026* (2013.01); *H04L 12/4641* (2013.01); *H04L 45/245* (2013.01); *H04L 45/748* (2013.01); *H04L 47/2441* (2013.01); *H04L 49/3009* (2013.01); *H04L 49/3063* (2013.01); *H04L 2101/622* (2022.05)

(58) Field of Classification Search
CPC ............. H04L 12/4633; H04L 12/4641; H04L 43/026; H04L 45/745; H04L 45/748; H04L 47/125; H04L 47/2441; H04L 49/3009
USPC ................................ 370/235, 252, 389, 392
See application file for complete search history.

(56) References Cited

U.S. PATENT DOCUMENTS

| | | | |
|---|---|---|---|
| 8,570,856 B2 | 10/2013 | Southworth et al. | |
| 9,246,820 B1* | 1/2016 | Singh | .................... H04L 47/125 |
| 9,282,061 B1 | 3/2016 | Zoucha et al. | |

(Continued)

*Primary Examiner* — Harun Chowdhury
(74) *Attorney, Agent, or Firm* — Fountainhead Law Group PC

(57) ABSTRACT

A method and network device for network traffic flooding. Specifically, the method and network device disclosed herein implement the mitigation of the lack of data-link layer (or L2) addressing resolutions, usually learned by or programmed manually into the network device, through the flooding of affected network traffic across identified network broadcast domains. Flooding of the network traffic in the aforementioned manner may ensure that at least the destination(s) of the network traffic receives the network traffic at least in scenarios where which it is unknown out of which particular physical network interface(s) should the network traffic be transmitted to reach the destination(s).

20 Claims, 10 Drawing Sheets

(56) References Cited

U.S. PATENT DOCUMENTS

| | | | |
|---|---|---|---|
| 2004/0066780 A1* | 4/2004 | Shankar | H04L 45/742 370/252 |
| 2012/0127996 A1* | 5/2012 | Grosser | H04L 45/745 370/392 |
| 2014/0211623 A1* | 7/2014 | Choi | H04L 47/125 370/235 |
| 2016/0254999 A1* | 9/2016 | Labonte | H04L 45/748 370/392 |
| 2017/0041209 A1* | 2/2017 | Joshi | H04L 45/745 |
| 2021/0203586 A1* | 7/2021 | Liu | H04L 12/4641 |

* cited by examiner

NETWORK TRAFFIC FLOODING FOR UNKNOWN DATA-LINK TO TRANSPORT MAPPING SCENARIOS

BACKGROUND

Existing solutions for implementing network traffic flooding rely on previous generation network processors, which exhibit antiquated processing pipeline designs. Some current or next generation network processors provide substantive processing pipeline design changes, which render the existing solutions for implementing network traffic flooding ineffective.

DETAILED DESCRIPTION

Figure 1A:
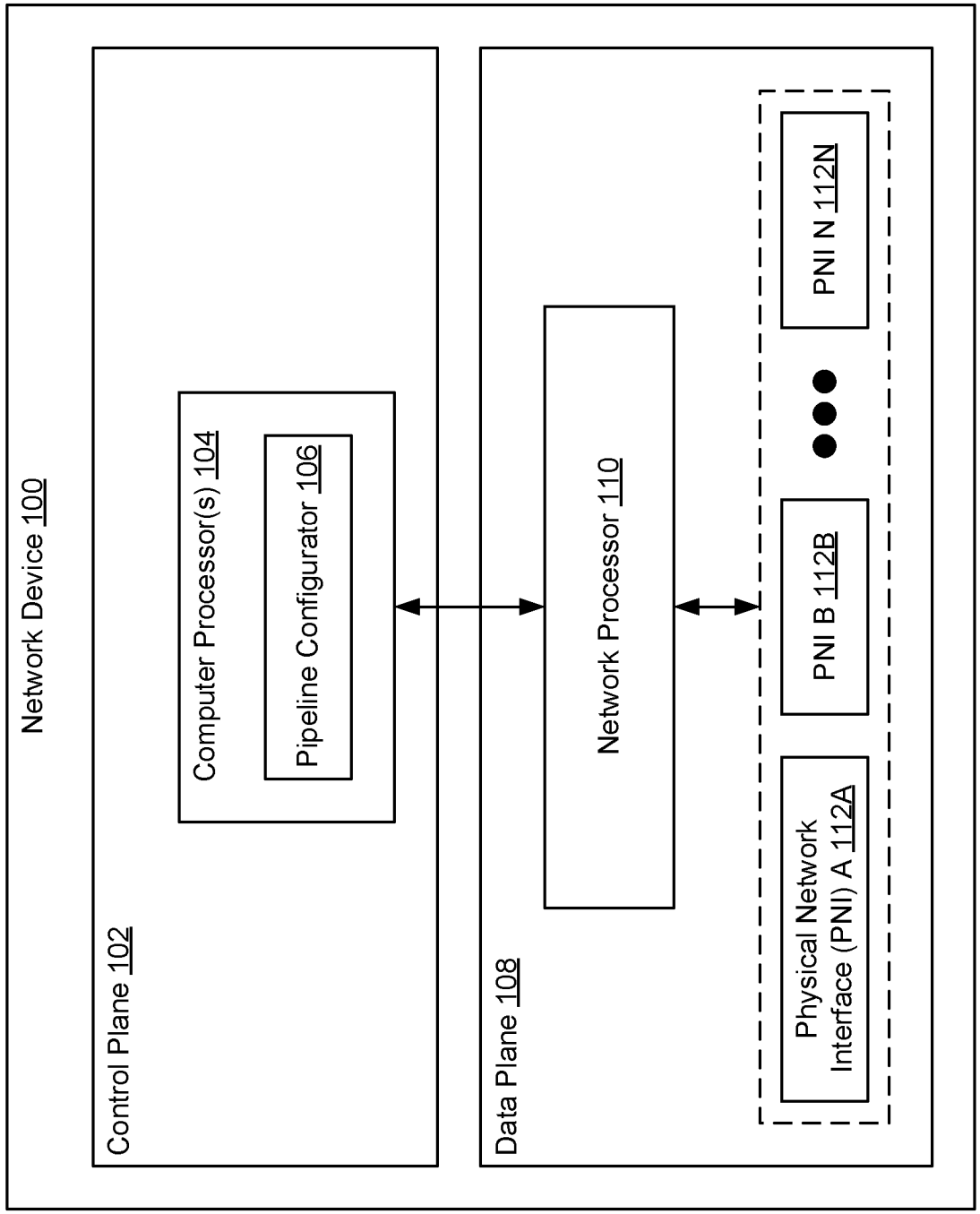
FIG. 1A shows a network device in accordance with one or more embodiments.

Specific embodiments will now be described in detail with reference to the accompanying figures.

In general, embodiments described herein relate to network traffic flooding. Specifically, one or more embodiments described herein entail mitigating the lack of data-link layer (or L2) addressing resolutions, usually learned by or programmed manually into network devices, through the flooding of affected network traffic across identified network broadcast domains. Flooding of the network traffic in the aforementioned manner may ensure that at least the destination(s) of the network traffic receives the network traffic at least in scenarios where which it is unknown out of which particular physical network interface(s) should the network traffic be transmitted to reach the destination(s).

With respect to network traffic forwarding, a network device may often maintain and rely on certain mappings, which may be used to pass on received network traffic to appropriate next hops along paths towards respective destinations. These mappings may include, but are not limited to, a network layer (or L3) to data-link layer (e.g., Internet Protocol (IP) to media access control (MAC)) mapping and a data-link layer to transport layer (or L4) (e.g., MAC to port) mapping. Of the aforementioned mappings, a network device may become aware of the former through, for example, the address resolution protocol (ARP) and the latter through a process called MAC learning.

Further, at times throughout their operational lifetime, any given network device may or may not have either or both of the above-mentioned mappings needed to forward network traffic. For when the data-link layer to transport layer mapping is unknown, a network device may be programmed to drop or flood any network traffic whose forwarding may be reliant on the unknown data-link layer to transport layer mapping.

In the following detailed description of the embodiments, numerous specific details are set forth in order to provide a more thorough understanding of the various embodiments. However, it will be apparent to one of ordinary skill in the art that the invention may be practiced without these specific details. In other instances, well-known features have not been described in detail to avoid unnecessarily complicating the description.

In the following description of FIGS. 1A-3B, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connecting the operatively connected components) connection.

FIG. 1A shows a network device in accordance with one or more embodiments. The network device (100) may represent a physical device that facilitates communication and interaction between endpoints (e.g., computing devices) in a network (not shown) (e.g., a local area network (LAN), a wide area network (WAN) such as the Internet, a mobile network, any other network type, or any combination thereof). To that extent, generally, the network device (100) may include functionality to receive network traffic (or more specifically, network traffic data units) through physical network interfaces (PNIs) (112A-112N) (also referred to as physical ports) (described below), and determine whether to: (a) drop the network traffic; (b) process the network traffic in accordance with a configuration of the network device (100); and/or (c) send the network traffic, based on the processing, out through other PNIs (112A-112N). A network traffic data unit may represent any single unit of information transmitted amongst endpoints of a network—e.g., a layer-2 (L2) or data-link layer frame, a layer-3 (L3) or network layer packet, a layer-4 (L4) or transport layer datagram, etc.

In one or more embodiments described herein, how the network device (100) may process network traffic may depend, at least in part, on whether the network device (100) operates as a L2 switch or a L3 switch (also referred to as a multilayer switch)—the latter of which may perform at least some functions of a router. If the network device (100) operates as a L2 switch, the network device (100) may use a destination media access control (MAC) address, along with one or more forwarding data structures and/or policies, to determine out of which PNI(s) (112A-112N) to send the network traffic towards one or more next hops (e.g., other network devices and/or endpoints). Alternatively, if the network device (100) operates as a L3 switch, the network device (100) may use a destination Internet Protocol (IP) address, along with one or more routing data structures and/or policies, to determine out of which PNI(s) (112A-112N) to send the network traffic towards one or more next hops. Furthermore, if the network device (100) operates as a L3 or multilayer switch, the network device (100) may include functionality to process network traffic using both MAC addresses and IP addresses.

In one or more embodiments described herein, the network device (100) may include a control plane (102) and a data plane (108). The control plane (102) may represent a portion of the network device (100) architecture that may be responsible for determining where to send network traffic. The determinations may rely, at least in part, on a dynamically changing network topology maintained by the control plane (102) through the sharing of routing (and/or other networking) protocol information amongst the various interconnected network devices of the network. On the other hand, the data plane (108) may represent another portion of the network device (100) architecture that may be responsible for receiving, parsing, processing, modifying, and transmitting network traffic. The data plane (108) may process and forward network traffic based on various data structures, policies, rules, and/or other information and instructions, which may be configured, managed, and updated by the control plane (102).

In one or more embodiments described herein, the control plane (102) may include, but is not limited to, one or more computer processors (104). A computer processor (104) may represent an integrated circuit configured to process computer readable program code or instructions. The computer readable program code may be stored, in whole or in part, temporarily or permanently, on non-transitory computer readable media, such as a storage device, flash memory, physical memory, or any other computer readable storage medium (not shown). Further, the computer readable program code, when executed by the computer processor(s) (104), may be configured to perform the embodiments described herein.

In one or more embodiments described herein, the control plane (102) may support various agents (not shown)—one of which may be a pipeline configurator (106). An agent may represent a computer program or process (i.e., an instance of a computer program) that may execute on the underlying hardware of the network device (100)—e.g., the computer processor(s) (104). Further, an agent may implement and manage one or more roles for which the control plane (102) may be responsible. Specifically, the pipeline configurator (106) may be responsible for configuring, updating, and/or managing network topology information, which may, at least in part, be shared with and used by the data plane (108) components (described below) to process and forward network traffic.

In one or more embodiments described herein, the data plane (108) may include, but is not limited to, a network processor (110) and two or more PNIs (112A-112N). The network processor (110) (also referred to as a switch chip) may represent a specialized integrated circuit predominantly responsible for the processing and forwarding of network traffic traversing through, destined to, and/or originating from the network device (100). To that extent, the network processor (110) may include functionality to perform the various steps outlined below in FIGS. 3A and 3B. Moreover, the network processor (110) is described in further detail below with respect to FIG. 1B.

In one or more embodiments described herein, each PNI (112A-112N) may represent physical hardware (e.g., circuitry) that serves as a point of interconnection between the network device (100) and another adjacent network device (not shown) or endpoint (not shown) in the network. Accordingly, each PNI (112A-112N) may include functionality to receive and/or transmit bit streams (forming one or more network traffic data units) across physical or wired connections from and/or to adjacent network devices and endpoints. Each PNI (112A-112N) may include further functionality to encode, multiplex, synchronize, and serialize network traffic in compliance with various networking protocols and/or standards.

While FIG. 1A shows a configuration of components, other network device (100) configurations may be used without departing from the scope described herein.

Figure 1B:
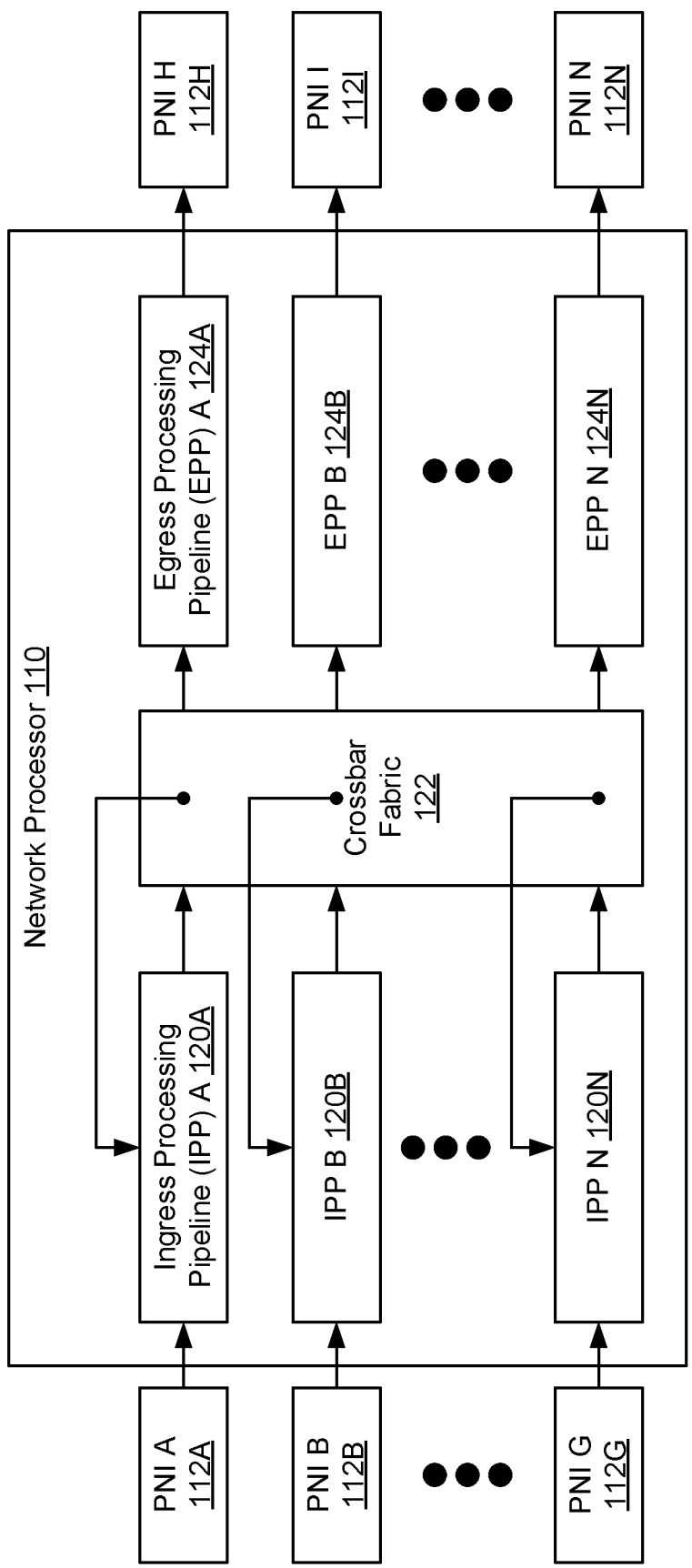
FIG. 1B shows a network processor in accordance with one or more embodiments.

FIG. 1B shows a network processor in accordance with one or more embodiments. The network processor (110) may represent a specialized integrated circuit responsible for processing and forwarding network traffic (i.e., network traffic data units). To that extent, the network processor (110) may include or provide one or more ingress processing pipelines (IPPs) (120A-120N), a crossbar fabric (122), and one or more egress processing pipelines (EPPs) (124A-124N). Each of these network processor (110) subcomponents is described below.

In one or more embodiments described herein, each IPP (120A-120N) may represent a set of successive data processing elements (or stages) (not shown) that collectively process and determine where to forward network traffic. Each of the set of data processing elements may be implemented through integrated circuitry, computer software, or a combination thereof. In addition, the set of data processing elements may access and utilize various data structures, policies, rules, and/or other information to achieve the aforementioned directive. Further, each IPP (120A-120N) may be responsible for processing network traffic that may arrive through a given (or mapped) ingress physical network interface (PNI) (112A-112G) of the network device (e.g., a first ingress PNI (112A) may map to a first IPP (120A), a second ingress PNI (112B) may map to a second IPP (120B), and so on). Moreover, the IPP(s) (120A-120N) is/are described in further detail below with respect to FIG. 2A.

In one or more embodiments described herein, the crossbar fabric (122) may represent a physical bridge (e.g., implemented through integrated circuitry) and/or a logical bridge (e.g., implemented through computer software), which may provide connectivity between the IPP(s) (120A-120N) and the EPP(s) (124A-124N). To that extent, the crossbar fabric (122) may include functionality to: receive forwarding information (e.g., one or more egress PNIs (112H-112N)) pertinent to forwarding network traffic, along with the network traffic, from the IPP(s) (120A-120N); and, subsequently, provide the received network traffic to the EPP(s) (124A-124N) mapped to the received forwarding information. While traversing the EPP(s) (124A-124N), the received network traffic may be modified and forwarded accordingly towards one or more desired next hops. One of ordinary skill will appreciate that additional information may traverse the crossbar fabric (122) from the IPP(s) (120A-120N) to the EPP(s) (124A-124N). Further, in one or more embodiments, the crossbar fabric (122) may include additional functionality to forward network traffic through physical internal loopback ports, respective to IPPs, should certain conditions apply, such as when it is unknown out of which particular PNI (112H-112N) should the network traffic be transmitted to reach a particular destination. Moreover, one of ordinary skill will appreciate that the crossbar fabric (122) may perform other functionalities without departing from the scope described herein.

In one or more embodiments described herein, each EPP (124A-124N) may represent a set of successive data processing elements (or stages) (not shown) that collectively modify and forward network traffic based, at least in part, on the processing of the network traffic performed by the IPP(s) (120A-120N). Each of the set of data processing elements may be implemented through integrated circuitry, computer software, or a combination thereof. In addition, the set of data processing elements may access and utilize various data structures, policies, rules, and/or other information (e.g., rewrite information passed from the IPP(s) (120A-120N)) to achieve the aforementioned directive. Further, each EPP (124A-124N) may be responsible for transmitting network traffic, to an operatively connected next hop, through a given (or mapped) egress PNI (112H-112N) (e.g., a first EPP (124A) may map to a first egress PNI (112H), a second EPP (124B) may map to a second egress PNI (1124 and so on). Moreover, the EPP(s) (124A-124N) is/are described in further detail below with respect to FIG. 2B.

While FIG. 1B shows a configuration of subcomponents, other network processor (110) configurations may be used without departing from the scope described herein.

Figure 2A:
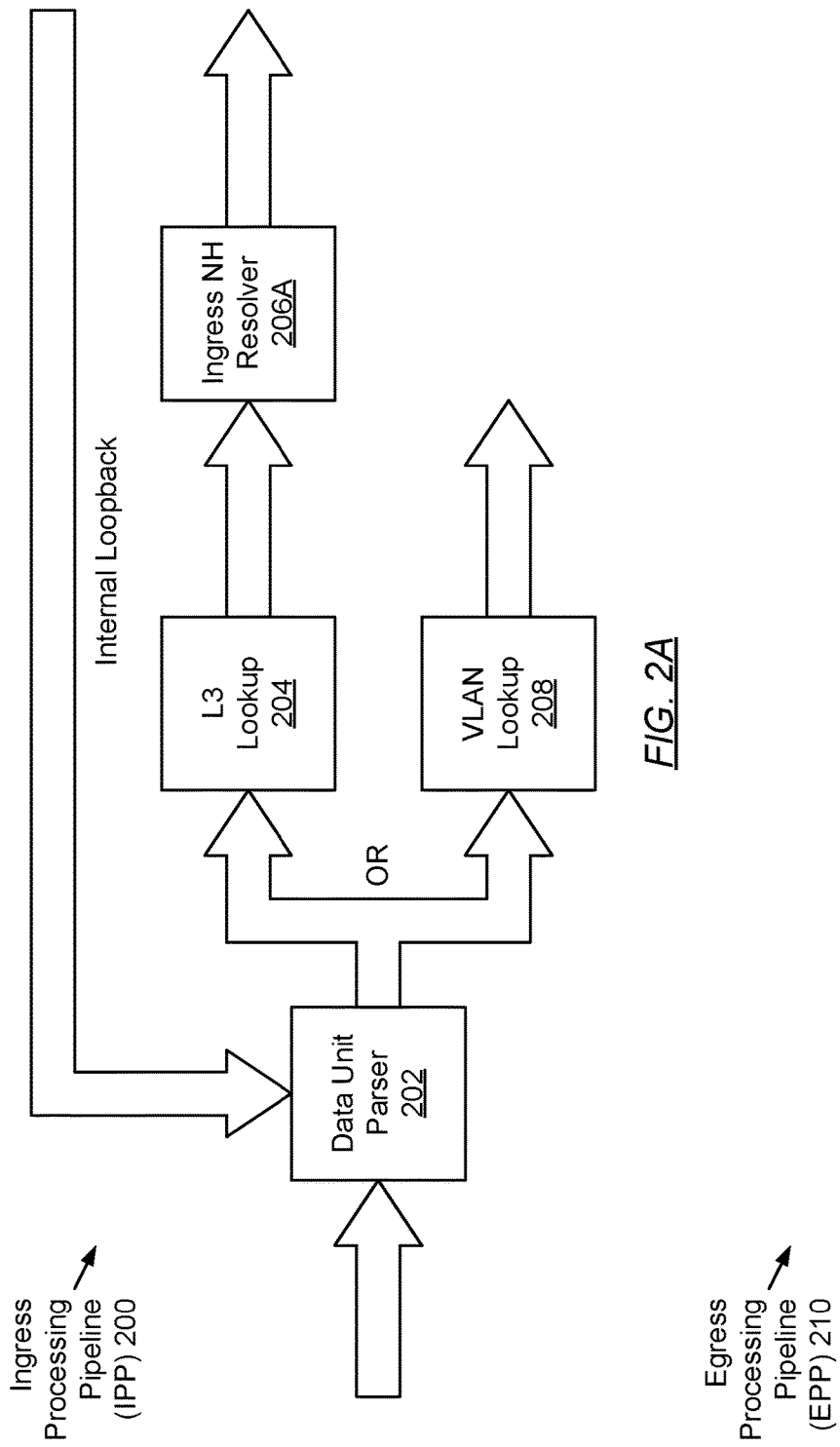
FIG. 2A shows an ingress processing pipeline in accordance with one or more embodiments.

FIG. 2A shows an ingress processing pipeline (IPP) in accordance with one or more embodiments. The IPP (200) may represent a set of successive data processing elements (or stages) that collectively process and determine where to forward network traffic. These data processing elements may include, but are not limited to, a network traffic data unit (e.g., frame, packet, datagram, etc.) parser (202), a layer-3 (L3) lookup (204), an ingress next hop resolver (206A), and a virtual local area network (VLAN) lookup (208). Each of these IPP (200) subcomponents is described below.

In one or more embodiments described herein, the network traffic data unit parser (202) may be responsible for extracting forwarding-pertinent information from network traffic data unit header information. For example, a network traffic data unit may take the form of a data-link layer (or L2) frame, wherefrom a media access control (MAC) header may be parsed. The MAC header may, in turn, be processed to extract one or more data fields that may, at least in part, form the MAC header—e.g., a destination MAC address, a destination VLAN identifier (ID), etc. By way of another example, a network traffic data unit may take the form of a network layer (or L3) packet, wherefrom an Internet Protocol (IP) header may be parsed. The IP header may, in turn, be processed to extract one or more data fields that may, at least in part, form the IP header—e.g., a destination IP address, etc. Embodiments described herein are not limited to the aforementioned examples.

Furthermore, following the extraction of the pertinent network traffic data unit header field(s), the network traffic data unit parser (202) may pass the network traffic data unit, and the extracted forwarding-pertinent information, to the subsequent data processing element(s) along the IPP (200)—i.e., the L3 lookup (204) or the VLAN lookup (208). Specifically, in one or more embodiments, if the network traffic data unit is being processed by the network traffic data unit parser (202) for the first time (i.e., has not been fed back through an internal loopback), then the network traffic data unit, and extracted forwarding-pertinent information, may be passed to the L3 lookup (204). On the other hand, in one or more other embodiments, if the network traffic data unit is being processed by the network traffic data unit parser (202) for the second time (i.e., has been fed back through an internal loopback), then the network traffic data unit, and extracted forwarding-pertinent information, may alternatively be passed to the VLAN lookup (208).

In one or more embodiments described herein, the L3 lookup (204) may be responsible for determining the next hop(s) to which network traffic may be directed. To that extent, the L3 lookup (204) may perform concurrent lookups: (a) on a L3 host table (see e.g., FIG. 2C) using one or more destination IP addresses to ascertain one or more next hop indices, respectively; and (b) on a longest prefix match (LPM) table (see e.g., FIG. 2C) using one or more destination network prefixes to ascertain one or more next hop indices, respectively. Thereafter, the L3 lookup (204) may pass the network traffic data unit and the identified next hop index/indices to the subsequent data processing element(s) along the IPP (200), such as the ingress next hop resolver (206A).

In one or more embodiments described herein, the ingress next hop resolver (206A) may be responsible for identifying a first portion of next hop forwarding information. This first portion of next hop forwarding information (see e.g., FIG. 2E) may take form as: (a) an egress physical network interface (PNI) of the network device; (b) a link aggregation (LAG) group index associated with a LAG group configured on the network device; or (c) a physical internal loopback port for the given IPP (200) on the network device. Of the aforementioned forms, the LAG group index may further map to a set of egress PNIs of the network device or, alternatively, to the physical internal loopback port for the given IPP (200) on the network device. Furthermore, identification of this first portion of next hop forwarding information may be contingent on the next hop index/indices passed from the L3 lookup (204), which may be used to perform lookups on an ingress next hop table (see e.g., FIG. 2D). Should lookups on the ingress next hop table result in the identification of LAG group indices, those indices, in turn, may be used to perform additional lookups on a LAG table (see e.g., FIG. 2G). The ingress next hop resolver (206A) may pass on further processing of at least the network traffic data unit to the crossbar fabric (see e.g., FIG. 1B).

In one or more embodiments described herein, the VLAN lookup (208) may be responsible for determining the next hop(s), belonging to a particular VLAN, to which network traffic may be flooded. Flooding of any received network traffic data units in this manner may transpire should egress PNI information remain unlearned (or unresolved) by the time of the initial processing of the network traffic data units. Further, the aforementioned particular VLAN may reference a logical grouping of devices (e.g., network devices and/or endpoints) within a same or common broadcast domain—to which the network traffic data unit(s) may belong. Accordingly, the VLAN lookup (208) may perform lookups on a VLAN table (see e.g., FIG. 2I) using extracted forwarding-pertinent information (i.e., VLAN identifiers) received from the network traffic data unit parser (202), to identify a set of egress PNIs, which may operatively connect, respectively, to a set of next hops belonging to a particular VLAN. Moreover, the VLAN lookup (208) may pass the network traffic data unit, and the identified set of egress PNIs, to the crossbar fabric (see e.g., FIG. 1B).

While FIG. 2A shows a configuration of subcomponents, other IPP (200) configurations may be used without departing from the scope described herein.

Figure 2B:
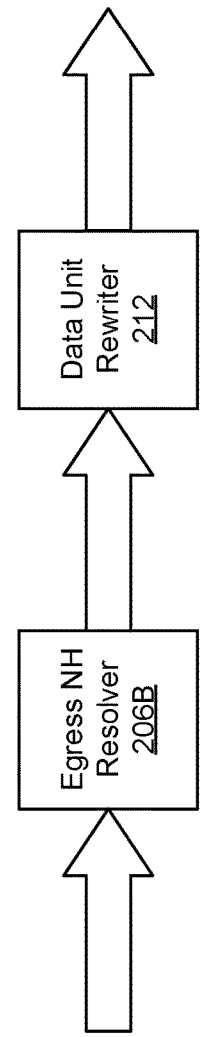
FIG. 2B shows an egress processing pipeline in accordance with one or more embodiments.

FIG. 2B shows an egress processing pipeline (EPP) in accordance with one or more embodiments. The EPP (210) may represent a set of successive data processing elements (or stages) that collectively forward network traffic to next hop(s) determined through one or more ingress processing pipelines (IPPs) (described above) (see e.g., FIG. 2A). These data processing elements may include, but are not limited to, an egress next hop resolver (206B) and a network traffic data unit (e.g., frame, packet, datagram, etc.) rewriter (212). Each of these EPP (210) subcomponents is described below.

In one or more embodiments described herein, the egress next hop resolver (206B) may be responsible for identifying a second portion of next hop forwarding information. This second portion of next hop forwarding information (see e.g., FIG. 2F) may take form as physical or L2 (e.g., MAC) addressing information associated with the next hop (i.e., other network device or endpoint) operatively connected through the egress PNI mapped to the EPP (210). Identification of this second portion of next hop forwarding information may, accordingly, depend on the egress PNI to EPP (210) mappings determined by the crossbar fabric (see e.g., FIG. 1B). Specifically, the physical addressing information may be identified through lookups performed on an egress next hop table (see e.g., FIG. 2D) using a next hop index that may have been identified during IPP processing of the network traffic. Further, the egress next hop resolver (206B) may pass the network traffic data unit, received from the crossbar fabric, and the identified physical addressing information, to the subsequent data processing element(s) along the EPP (210)—i.e., the network traffic data unit rewriter (212).

In one or more embodiments described herein, the network traffic data unit rewriter (212) may be responsible for modifying and transmitting network traffic towards a next hop. That is, the network traffic data unit rewriter (212) may replace one or more existing header data fields of a network traffic data unit with, for example, at least the physical or L2 addressing information received from the egress next hop resolver (206B). Other information from any of the previous data processing elements forming an IPP (200) and/or the EPP (210), as well as the crossbar fabric, may also be used to modify any header information portion of the network traffic data unit without departing from the scope described herein. Thereafter, following the modification of a network traffic data unit, the network traffic data unit rewriter (212) may forward or route the rewritten network traffic data unit towards a next hop.

While FIG. 2B shows a configuration of subcomponents, other EPP (210) configurations may be used without departing from the scope described herein.

Figure 2C:
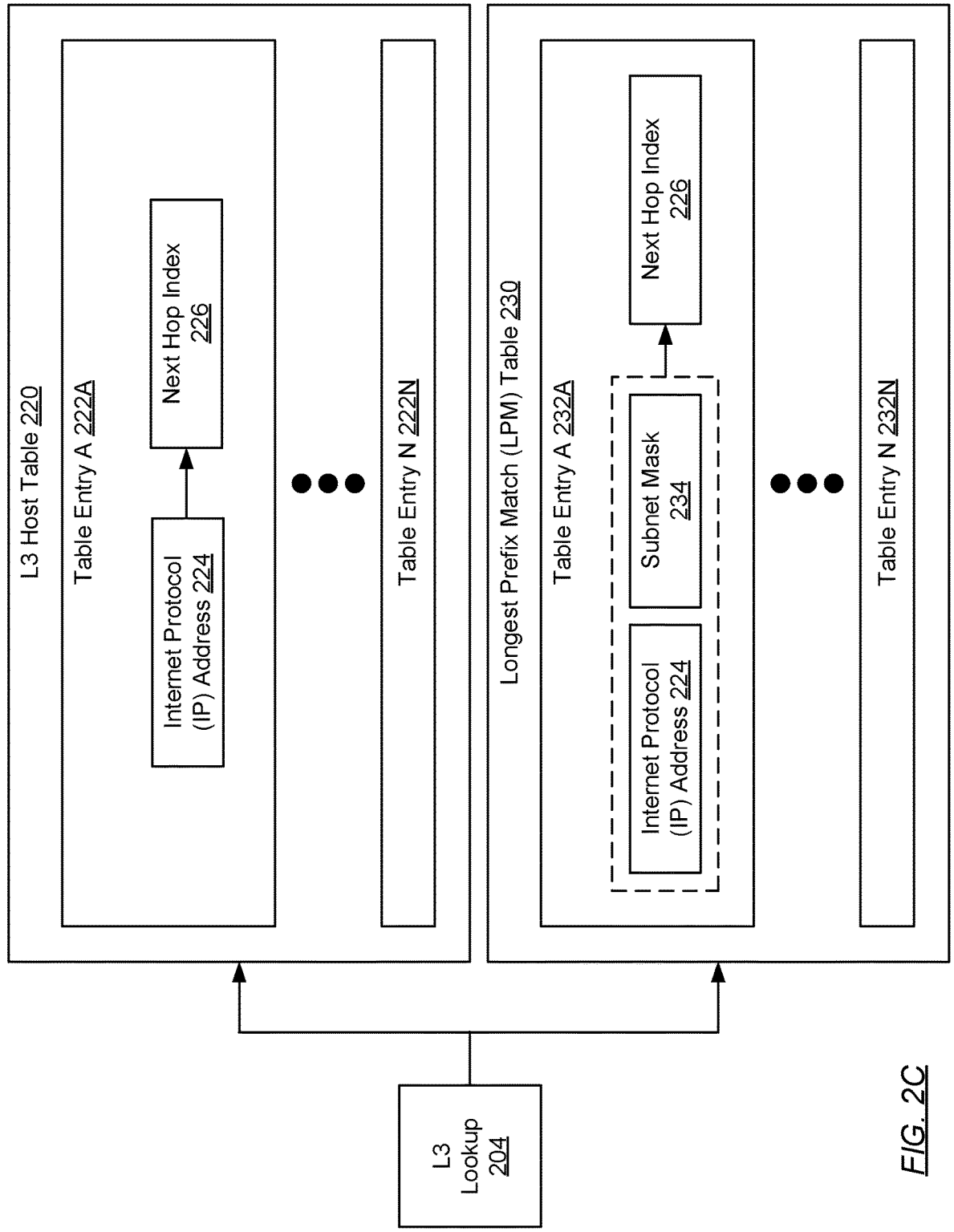
FIG. 2C shows data structures used by a layer-3 lookup in accordance with one or more embodiments.

FIG. 2C shows data structures used by a layer-3 (L3) lookup in accordance with one or more embodiments. The data structures may include, but are not limited to, a L3 host table (220) and a longest prefix match (LPM) table (230). Each of these L3 lookup (204) data structures is described below.

In one or more embodiments described herein, the L3 host table (220) may represent a data structure used for maintaining learned host routes. A host route may refer to a route (or path) to a specific device (i.e., a network device or an endpoint) in the network. The L3 host table (220) may include one or more table entries (222A-222N), wherein information pertaining to one or more host routes, respectively, may be stored. Specifically, each table entry (222A-222N) may map an Internet Protocol (IP) address (224) for a given host route to a next hop index (226). The IP address (224) may refer to a unique network layer (or L3) identifier associated with a specific device, whereas the next hop index (226) may refer to a unique identifier or pointer (i.e., a reference) associated with a table entry in an ingress and/or egress next hop table(s) (see e.g., FIG. 2D).

In one or more embodiments described herein, the LPM table (230) may represent a data structure used for maintaining learned subnetwork (or subnet) routes. A subnet route may refer to a route (or path) to a specific subnet (i.e., a logical grouping of two or more network devices and/or endpoints) in the network. The LPM table (230) may include one or more table entries (232A-232N), wherein information pertaining to one or more subnet routes, respectively, may be stored. Specifically, each table entry (232A-232N) may map a network prefix for a given subnet route to a next hop index (226) (described above). The network prefix may refer to an aggregation of IP addresses belonging to a specific subnet, which may be defined through the application of a subnet mask (234) over an IP address (224). The IP address (224) (described above) may be assigned to one of the specific devices belonging to the specific subnet, whereas the subnet mask (234) may refer to a bitmask or a sequence of binary digits (i.e., 1's and 0's) used to distinguish the network (or subnetwork) portion of the IP address (224).

Figure 2D:
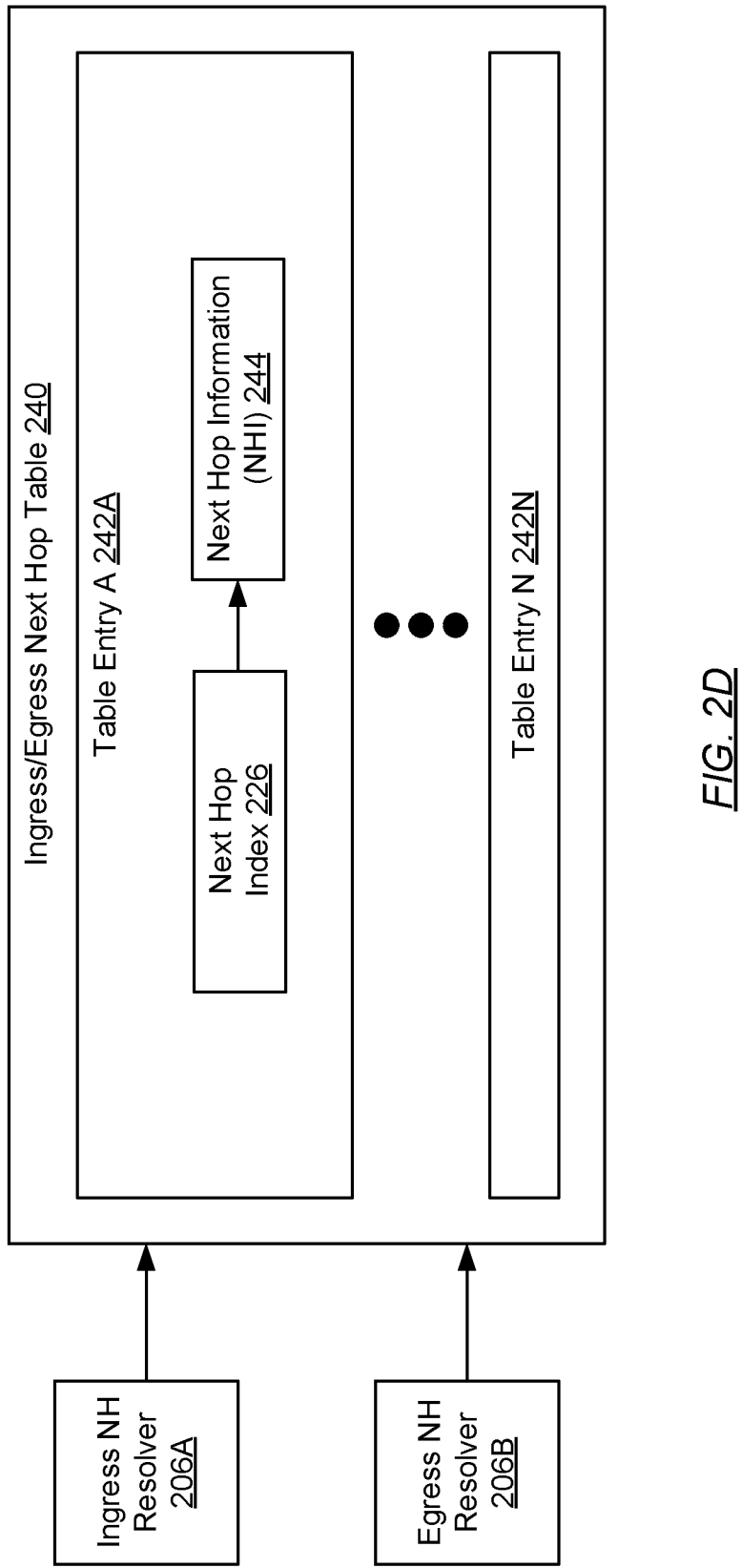
FIG. 2D shows a data structure used by ingress and egress next hop resolvers in accordance with one or more embodiments.

FIG. 2D shows a data structure used by ingress and egress next hop resolvers in accordance with one or more embodiments. The data structure may take the form of a next hop table (240). Specifically, in one or more embodiments, the ingress next hop resolver (206A) (see e.g., FIG. 2A) may have access and perform pertinent lookups on a first (i.e., ingress) next hop table, whereas the egress next hop resolver (206B) (see e.g., FIG. 2B) may have access and perform pertinent lookups on a second (i.e., egress) next hop table. Alternatively, in one or more other embodiments, both the ingress and egress next hop resolvers (206A, 206B) may have access and perform pertinent lookups on a shared (i.e., single) next hop table.

Figure 2E:
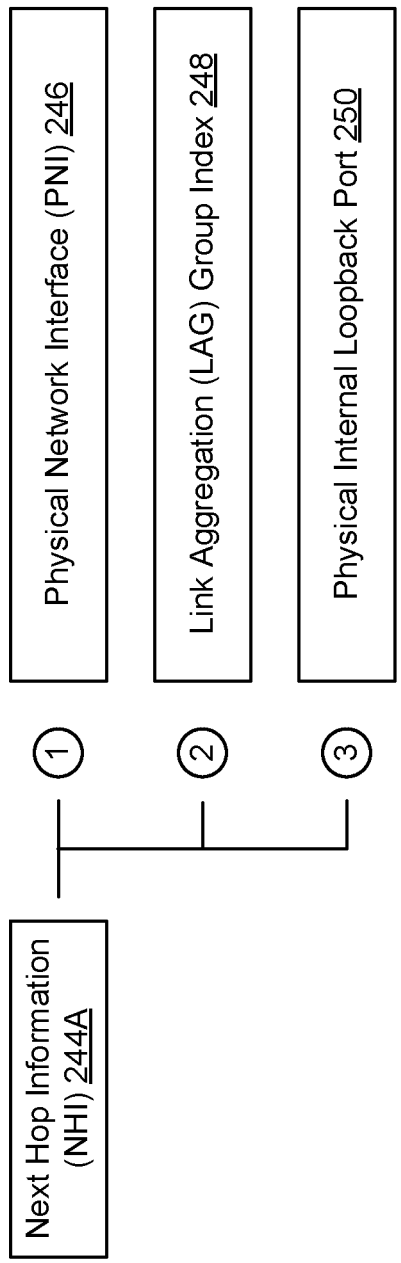
FIG. 2E shows ingress next hop information in accordance with one or more embodiments.
Figure 2F:
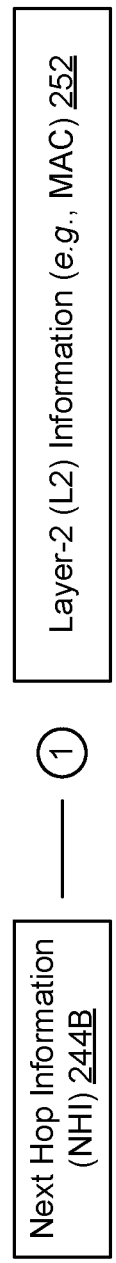
FIG. 2F shows egress next hop information in accordance with one or more embodiments.

In the latter embodiment(s), however, the shared next hop table may be divided such that a first set of table entries may be allocated for ingress next hop information (NHI) (see e.g., FIG. 2E), whereas a second set of table entries may be allocated for egress NHI (see e.g., FIG. 2F). Further, in either the former or latter embodiment(s), the next hop table (240) may include one or more table entries (242A-242N), wherein learned forwarding information for one or more next hops, respectively, may be maintained. More specifically, each table entry (242A-242N) may map a next hop index (226) to NHI (244) associated with a given next hop (i.e., another network device or an endpoint). The next hop index (226) may refer to a unique identifier or pointer (i.e., a reference) associated with the table entry in ingress, egress, and/or shared next hop table (240), whereas the NHI (244) may represent information pertinent to transmitting network traffic towards the given next hop. NHI (244) is described in further detail below with respect to FIGS. 2E and 2F.

FIG. 2E shows ingress next hop information (NHI) in accordance with one or more embodiments. Ingress NHI (244A) may represent a first portion of information pertinent to the transmission of network traffic towards given next hops (i.e., other network devices and/or endpoints), where this said first portion of information may be identified during a traversal of the network traffic through the ingress processing pipeline(s) (IPP) of a network processor (see e.g., FIGS. 1B and 2A) of a network device.

Specifically, in one or more embodiments, ingress NHI (244A) may specify, but is not limited to: (a) a physical network interface (PNI) (246) of the network device; (b) a link aggregation (LAG) group index (248); and (c) a physical internal loopback port (250) associated with the given IPP through which given network traffic may be traversing. The PNI (246) may represent physical hardware (e.g., circuitry) that serves as a point of interconnection between the network device and a given next hop. Further, the LAG group index (248) may refer to a unique identifier (or pointer) (i.e., a reference) associated with a table entry in the LAG table (see e.g., FIG. 2G). Meanwhile, the physical internal loopback port (250) may represent physical hardware (e.g., circuitry) that serves as a point of intra-connection between the crossbar fabric (see e.g., FIG. 1B) and a first data processing element (i.e., network traffic data unit parser) (see e.g., FIG. 2A) of the given IPP through which given network traffic may be traversing.

FIG. 2F shows egress next hop information (NHI) in accordance with one or more embodiments. Egress NHI (244B) may represent a second portion of information pertinent to the transmission of network traffic towards given next hops (i.e., other network devices and/or endpoints), where this said second portion of information may be identified during a traversal of the network traffic through the egress processing pipeline(s) (EPP) of a network processor (see e.g., FIGS. 1B and 2B) of a network device.

Specifically, in one or more embodiments, egress NHI (244B) may specify, but is not limited to, data-link layer (or L2) information associated with a given next hop. By way of an example, the data-link layer information may include a media access control (MAC) address belonging to the given next hop.

Figure 2G:
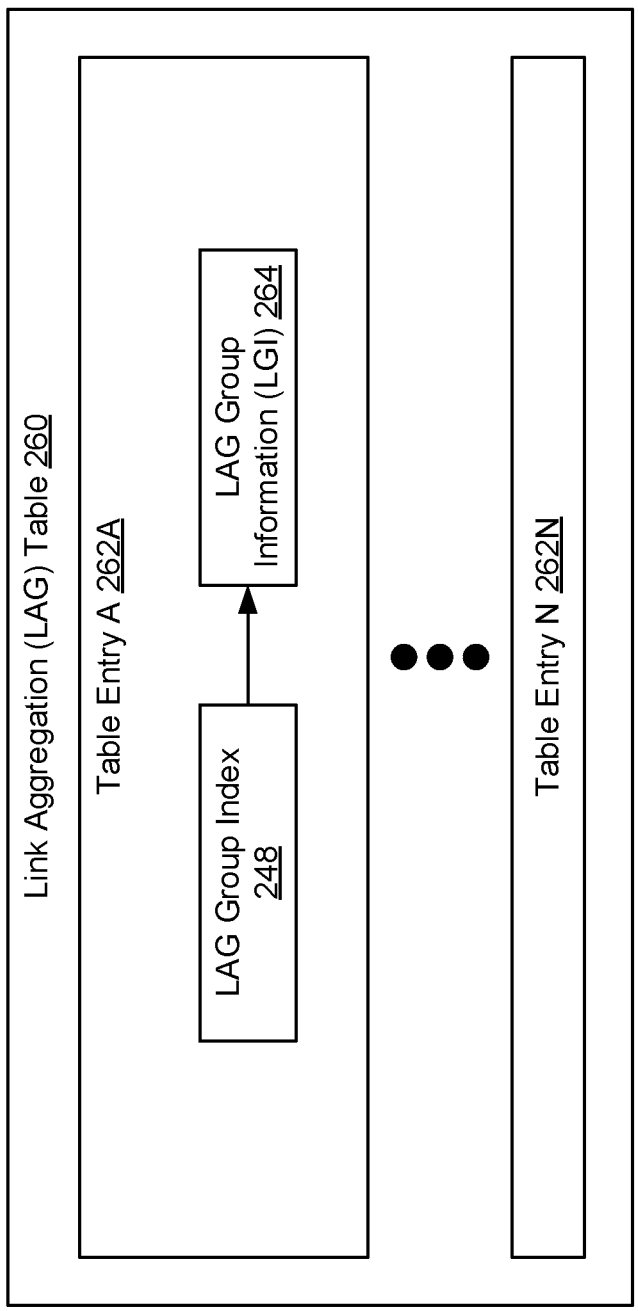
FIG. 2G shows a link aggregation table in accordance with one or more embodiments.

FIG. 2G shows a link aggregation (LAG) table in accordance with one or more embodiments. The LAG table (260) may represent a data structure used for maintaining information pertaining to LAG groups configured on the network device. Specifically, the LAG table (260) may include one or more table entries (262A-262N), wherein information associative of one or more LAG groups, respectively, may be stored. A LAG group may refer to a logical grouping of physical network interfaces (PNIs) of the network device, which may be configured together to form a single aggregated (i.e., high-bandwidth) network traffic path.

Further, in one or more embodiments, each table entry (262A-262N) may map a LAG group index (248) to LAG group information (LGI) (264) for a given LAG group. The LAG group index (248) may refer to a unique identifier (or pointer) (i.e., a reference) associated with the table entry (262A-262N), whereas the LGI (264) may represent information pertinent to transmitting network traffic towards one or more given next hops operatively connected through one or more member PNIs, respectively, of the given LAG group. LGI (264) is described in further detail below with respect to FIG. 2H.

Figure 2H:
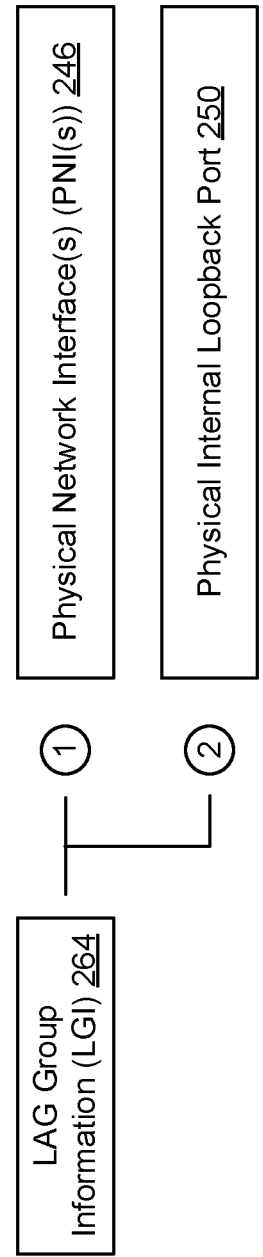
FIG. 2H shows link aggregation group information in accordance with one or more embodiments.

FIG. 2H shows link aggregation group information (LGI) in accordance with one or more embodiments. LGI (264) may represent information pertinent to transmitting network traffic towards one or more given next hops (i.e., other network device(s) and/or endpoint(s)). Specifically, LGI (264) may specify, but is not limited to: (a) one or more physical network interfaces (PNIs) (246) of a network device; and (b) a physical internal loopback port (250) associated with a given ingress processing pipeline (IPP) (see e.g., FIGS. 1B and 2A) through which given network traffic may be traversing. Each PNI (246) may represent physical hardware (e.g., circuitry) that serves as a point of interconnection between the network device and a given next hop. Meanwhile, the physical internal loopback port (250) may represent physical hardware (e.g., circuitry) that serves as a point of intra-connection between the crossbar fabric (see e.g., FIG. 1B) and a first data processing element (i.e., network traffic data unit parser) (see e.g., FIG. 2A) of the given IPP through which given network traffic may be traversing.

Figure 2I:
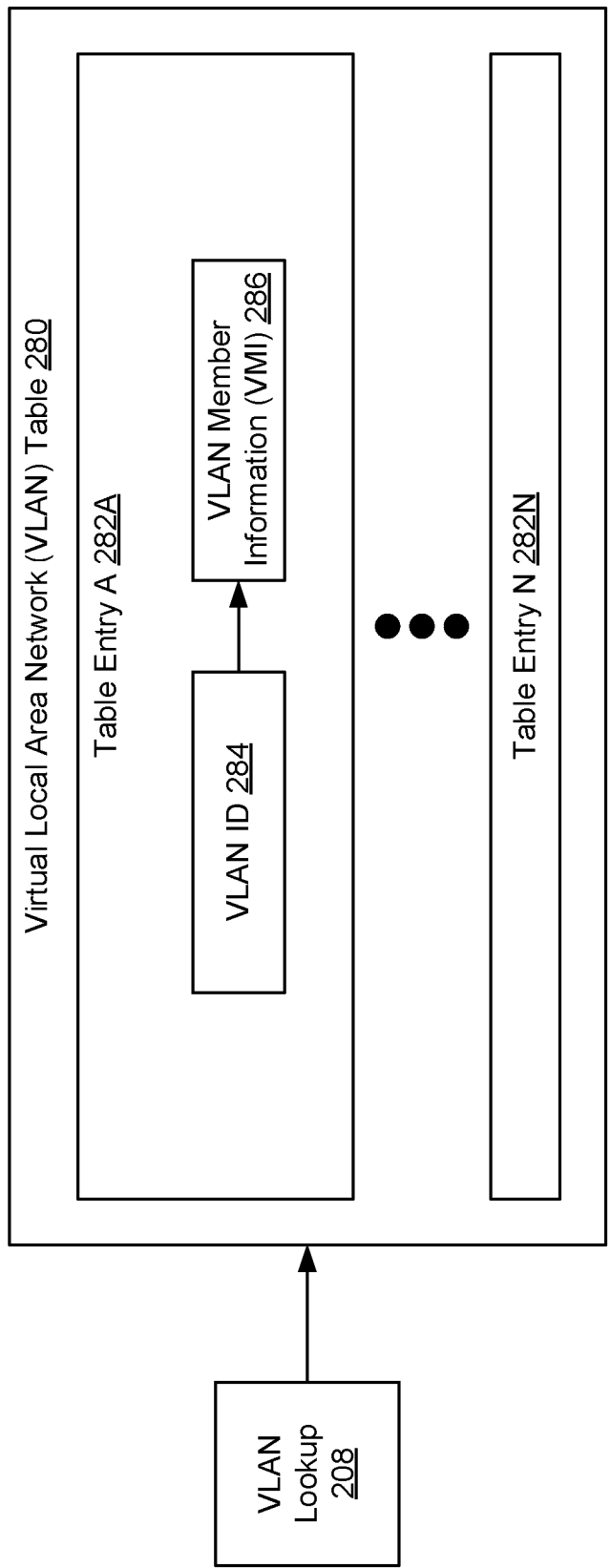
FIG. 2I shows a data structure used by a virtual local area network lookup in accordance with one or more embodiments.

FIG. 2I shows a data structure used by a virtual local area network (VLAN) lookup in accordance with one or more embodiments. The data structure may take the form of a VLAN table (280), which may be used to maintain information pertaining to VLANs learned by, or programmed manually into, the network device. Specifically, the VLAN table (280) may include one or more table entries (282A-282N), wherein information associative of one or more VLANs, respectively, may be stored. A VLAN may represent a logical grouping of devices (e.g., network devices and/or endpoints) configured to be within a same or common broadcast domain.

Further, in one or more embodiments, each table entry (282A-282N) may map a VLAN identifier (ID) (284) to VLAN member information (VMI) (286) for a given VLAN. The VLAN ID (284) may refer to a unique network-wide identifier assigned to the given VLAN, as well as a unique identifier (or pointer) (i.e., a reference) associated with the table entry (282A-282N), whereas the VMI (286) may represent information pertinent to transmitting network traffic towards one or more given next hops belonging to the given VLAN. VMI (286) is described in further detail below with respect to FIG. 2J.

Figure 2J:
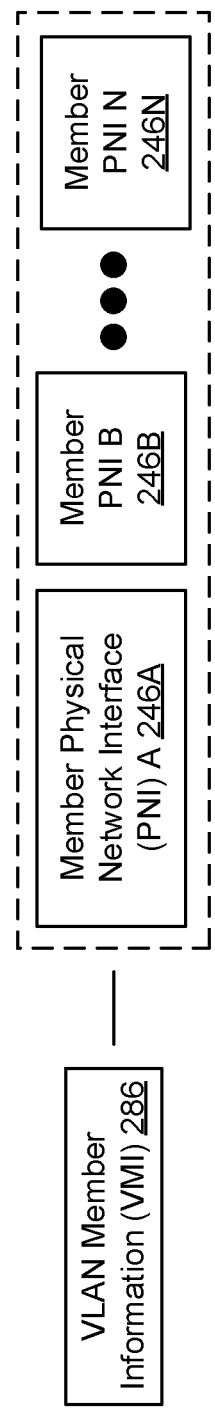
FIG. 2J shows virtual local area network member information in accordance with one or more embodiments.

FIG. 2J shows virtual local area network (VLAN) member information (VMI) in accordance with one or more embodiments. VMI (286) may represent information pertinent to transmitting network traffic towards one or more next hops assigned to a given broadcast domain. Specifically, VMI (286) may specify, but is not limited to, one or more physical network interfaces (PNIs) (246A-246N) of a network device. Each PNI (246A-246N) may represent physical hardware (e.g., circuitry) that serves as a point of interconnection between the network device and a given next hop assigned to the given broadcast domain (i.e., given VLAN).

Figure 3A:
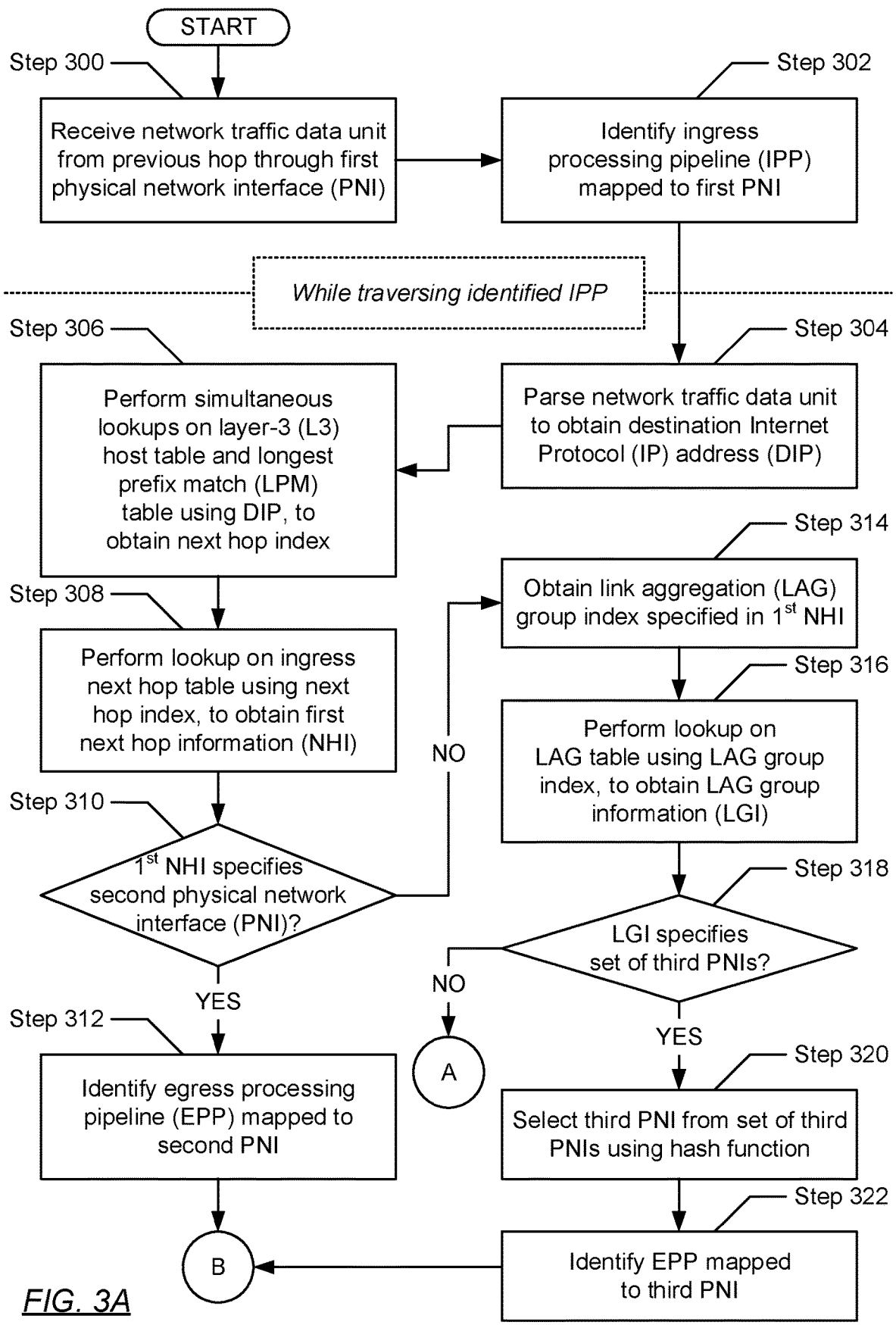
FIGS. 3A and 3B show flowcharts describing a method for processing network traffic in accordance with one or more embodiments.
Figure 3B:
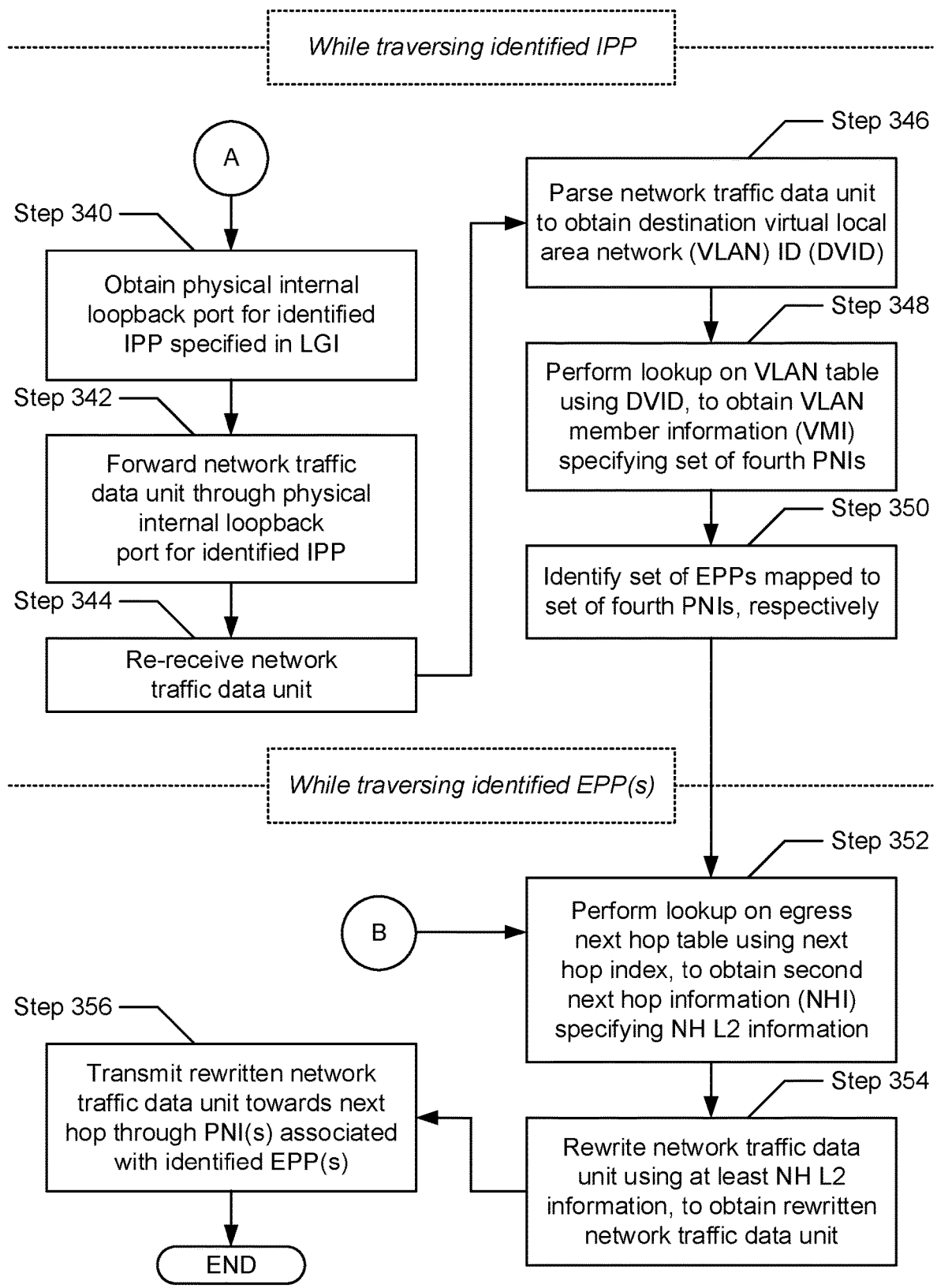

FIGS. 3A and 3B show flowcharts describing a method for processing network traffic in accordance with one or more embodiments. The various steps outlined below may be performed by the network processor of a network device (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

In one or more embodiments described herein, the various steps outlined below may be partitioned into: (a) a first subset of steps (i.e., Steps 300 and 302), which may be performed prior to the identification of an ingress processing pipeline (IPP) (see e.g., FIGS. 1B and 2A) configured in the network processor of the network device; (b) a second subset of steps (i.e., Steps 304 through 350), which may be performed while traversing the aforementioned IPP (identified during the first subset of steps) and prior to the identification of an egress processing pipeline (EPP) (see e.g., FIGS. 1B and 2B) configured in the network processor of the network device; and (c) a third subset of steps (i.e., Steps 352 through 356), which may be performed while traversing the aforementioned EPP (identified during the second subset of steps).

Turning to FIG. 3A, in Step 300, a network traffic data unit (e.g., frame, packet, datagram, etc.) is received from a previous hop. In one or more embodiments, the previous hop may refer to another network device, also disposed along the path to a destination device of the network traffic data unit, or to a source endpoint. Further, the network traffic data unit may have been received through a first physical network interface (PNI) of the network device.

In Step 302, an IPP, of various IPPs configured on the network device, is identified. Specifically, in one or more embodiments, the identified IPP may map to, and may subsequently be responsible for processing network traffic arriving through, the first PNI (through which the network traffic data unit had been received in Step 300).

In Step 304, the network traffic data unit (received in Step 300) is parsed to at least obtain a destination Internet Protocol (IP) address (DIP) from header information embedded therein. In one or more embodiments, the DIP may refer to a unique network layer (or L3) identifier associated with the destination device of the network traffic data unit.

In Step 306, simultaneous (or concurrent) lookups are performed on the L3 host table and the longest prefix match (LPM) table (see e.g., FIG. 2C) using the DIP (obtained in Step 304). In one or more embodiments, the lookups may result in the identification of an existing table entry of the L3 host table, wherein a next hop index may be specified and obtained therefrom. In one or more other embodiments, the lookups may alternatively result in the identification of an existing table entry of the LPM table, wherein another next hop index may be specified and obtained therefrom. In one or more alternative embodiments, the lookups may result in the identification of existing table entries in both the L3 host table and the LPM table. In these alternative embodiments, however, the existing table entry of the L3 host table may be considered, while the existing table entry of the LPM table may be ignored, based on maintenance of more specific next hops by the former versus the latter.

In Step 308, a lookup is performed on an ingress next hop table (see e.g., FIG. 2D) or, alternatively, amongst a set of existing ingress table entries in a shared next hop table, using the next hop index (obtained in Step 306). In one or more embodiments, the lookup may result in the identification of an existing table entry of the ingress (or shared) next hop table, wherein first next hop information (NHI) (see e.g., FIG. 2E) may be specified and obtained therefrom. The first NHI may take form as: (a) a second PNI of the network device; (b) a link aggregation (LAG) group index; or (c) a physical internal loopback port for the IPP (identified in Step 302).

In Step 310, a determination is made as to whether the first NHI (obtained in Step 308) specifies the above-mentioned second PNI of the network device. Accordingly, in one or more embodiments, if it is determined that the first NHI specifies the second PNI, then the process proceeds to Step 312. On the other hand, in one or more other embodiments, if it is alternatively determined that the first NHI alternatively specifies the above-mentioned LAG group index (or the above-mentioned physical internal loopback port for the IPP), then the process alternatively proceeds to Step 314.

In Step 312, following the determination (in Step 310) that the first NHI (obtained in Step 308) specifies an above-mentioned second PNI of the network device, an EPP, of various EPPs configured on the network device, is identified. Specifically, in one or more embodiments, the identified EPP may map to, and may subsequently be responsible for modifying and transmitting network traffic through, the second PNI. Further, from here, the process proceeds to Step 352 (see e.g., FIG. 3B).

In Step 314, following the alternative determination (in Step 310) that the first NHI (obtained in Step 308) specifies an above-mentioned LAG group index, the LAG group index is obtained. Thereafter, in Step 316, a lookup is performed on the LAG table (see e.g., FIG. 2G) using the LAG group index (obtained in Step 314). In one or more embodiments, the lookup may result in the identification of an existing table entry of the LAG table, wherein LAG group information (LGI) (see e.g., FIG. 2H) may be specified and obtained therefrom. The LGI may take form as: (a) a set of third PNIs of the network device; or (b) a physical internal loopback port for the IPP (identified in Step 302).

In Step 318, a determination is made as to whether the LGI (obtained in Step 316) specifies the above-mentioned set of third PNIs of the network device. Accordingly, in one or more embodiments, if it is determined that the LGI specifies the set of third PNIs, then the process proceeds to Step 320. On the other hand, in one or more other embodiments, if it is alternatively determined that the LGI alternatively specifies the above-mentioned physical internal loopback port for the IPP (identified in Step 302), then the process alternatively proceeds to Step 340 (see e.g., FIG. 3B).

In Step 320, following the determination (in Step 318) that the LGI (obtained in Step 316) specifies an above-mentioned third set of PNIs of the network device, a third PNI is selected from the third set of PNIs. In one or more embodiments, selection of the third PNI may entail the use of a hash function, or any mathematical function or algorithm configured to map input keys to any specified range of indices. Any given input key may be assembled from header information embedded in the network traffic data unit (received in Step 300) and/or other IPP lookup metadata. Further, each index in the specified range of indices may identify or reference one of the PNIs (including the third PNI) from the third set of PNIs.

In Step 322, an EPP, of various EPPs configured on the network device, is identified. Specifically, in one or more embodiments, the identified EPP may map to, and may subsequently be responsible for modifying and transmitting network traffic through, the third PNI (selected in Step 320). Further, from here, the process proceeds to Step 352 (see e.g., FIG. 3B).

Turning to FIG. 3B, in Step 340, following the alternative determination (in Step 318) that the LGI (obtained in Step 316) specifies an above-mentioned physical internal loopback port for the IPP (identified in Step 302), the physical internal loopback port for the IPP is obtained. In Step 342, the network traffic data unit (received in Step 300) is subsequently forwarded through the physical internal loopback port for the IPP (obtained in Step 340). Further, in Step 344, the network traffic data unit (looped back in Step 342) is re-received at the start of the aforementioned IPP.

In Step 346, the network traffic data unit (re-received in Step 544) is parsed to at least obtain a destination virtual local area network (VLAN) identifier (DVID) from header information embedded therein. In one or more embodiments, the DVID may refer to a unique identifier associated with a destination VLAN, or a logical grouping of devices (e.g., network devices and/or endpoints) within a same or common broadcast domain—to which the network traffic data unit may belong.

In Step 348, a lookup is performed on the VLAN table (see e.g., FIG. 2I) using the DVID (obtained in Step 346). In one or more embodiments, the lookup may result in the identification of an existing table entry of the VLAN table, wherein VLAN member information (VMI) (see e.g., FIG. 2J) may be specified and obtained therefrom. The VMI, in turn, may specify a set of fourth PNIs of the network device.

In Step 350, a subset of EPPs, of various EPPs configured on the network device, is identified. Specifically, in one or more embodiments, each EPP of the identified subset of EPPs may map to, and may subsequently be responsible for modifying and transmitting network traffic through, a given fourth PNI of the set of fourth PNIs (specified in VMI obtained in Step 348).

In Step 352, a lookup is performed on an egress next hop table (see e.g., FIG. 2D) or, alternatively, amongst a set of existing egress table entries in a shared next hop table, using the next hop index (obtained in Step 306). In one or more embodiments, the lookup may result in the identification of an existing table entry of the egress (or shared) next hop table, wherein second NHI (see e.g., FIG. 2F) may be specified and obtained therefrom. The second NHI may take form as data-link layer (or L2) information (e.g., a next hop media access control (MAC) address, etc.).

In Step 354, the network traffic data unit (received in Step 300 or re-received in Step 344) is rewritten. Specifically, in one or more embodiments, at least a portion of the existing L2 information, embedded in header information of the network traffic data unit, may be replaced with the second NHI (obtained in Step 352). Further, through rewriting of the network traffic data unit, a rewritten network traffic data unit may be obtained.

In Step 356, the rewritten network traffic data unit (obtained in Step 354) is subsequently transmitted out the network device. That is, in one or more embodiments, the rewritten network traffic data unit may be forwarded through the second PNI (specified in first NHI obtained in Step 308) and towards a singular next hop associated with the DIP (obtained in Step 304). In one or more other embodiments, the rewritten network traffic data unit may be forwarded through the third PNI (selected in Step 320) and towards a respective next hop, assigned to a member of a LAG group. In one or more other embodiments still, the rewritten network traffic data unit may be forwarded through each of the set of fourth PNIs (specified in VMI obtained in Step 348) and towards a set of next hops, respectively, belonging to the VLAN associated with the DVID (obtained in Step 346).

While the technology has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for forwarding network traffic, comprising:
   receiving a first network traffic data unit through a first physical network interface (PNI) of a network device;
   obtaining a first destination network address from the first network traffic data unit;
   in response to a PNI through which to forward the first network traffic data unit being unknown to the network device, forwarding the first network traffic data unit, without modification, through a physical internal loopback port identified based on the first destination network address and operatively connected to the first PNI;
   re-receiving, after forwarding through the physical internal loopback port, the first network traffic data unit at the first PNI;
   identifying a set of PNIs using a first destination broadcast domain identifier obtained from the re-received first network traffic data unit;
   rewriting at least a portion of header information belonging to the re-received first network traffic data unit to obtain a second network traffic data unit; and
   forwarding, through the set of PNIs, the second network traffic data unit to a set of next hops over a network.

2. The method of claim 1, wherein identifying the physical internal loopback port, comprises:
   performing, using at least the first destination network address, concurrent lookups on a layer-3 (L3) host table and a longest prefix match (LPM) table to obtain a next hop index; and
   retrieving, from a next hop table, next hop information (NHI) mapped to the next hop index, wherein the NHI specifies the physical internal loopback port.

3. The method of claim 1, wherein identifying the physical internal loopback port, comprises:
   performing, using at least the first destination network address, concurrent lookups on a layer-3 (L3) host table and a longest prefix match (LPM) table to obtain a next hop index;
   retrieving, from a next hop table, next hop information (NHI) mapped to the next hop index; and
   wherein the physical internal loopback port is identified using the NHI.

4. The method of claim 1, further comprising:
   prior to identifying the physical internal loopback port:
      identifying an ingress processing pipeline (IPP) mapped to the first PNI,
      wherein data processing elements of the IPP perform:
         the identifying of the physical internal loopback port instead of the second PNI based on the first destination network address;
         the forwarding of the first network traffic data unit through the physical internal loopback port;
         the re-receiving of the first network traffic data unit at the first PNI; and
         the identifying of the set of PNIs using the first destination broadcast domain identifier.

5. The method of claim 4, wherein the physical internal loopback port is associated with the IPP.

6. The method of claim 4, wherein the first network traffic data unit is re-received at a start of the IPP.

7. The method of claim 1, further comprising:
   prior to forwarding the second network traffic data unit:
      retrieving, from a next hop table, next hop information (NHI) mapped to a next hop index, wherein the at least portion of the header information of the first network traffic data unit is rewritten using the NHI to obtain the second network traffic data unit, wherein the next hop index is obtained through concurrent lookups on a layer-3 (L3) host table and a longest prefix match (LPM) table using the first destination network address.

8. The method of claim 7, further comprising:
prior to retrieving the NHI:
identifying a set of egress processing pipelines (EPPs) respectively mapped to the set of PNIs,
wherein data elements of each EPP of the set of EPPs perform:
the retrieving of the NHI mapped to the next hop index;
the rewriting of the at least portion of the header information of the first network traffic data unit using the NHI to obtain the second network traffic data unit; and
the forwarding of the second network traffic data unit through a respectively mapped PNI of the set of PNIs.

9. The method of claim 7, wherein the NHI comprises a data-link address.

10. The method of claim 9, wherein the data-link address is a media access control (MAC) address associated with a next hop for the second network traffic data unit, wherein the next hop is a network device or an endpoint.

11. The method of claim 1, wherein the first destination network address is an Internet Protocol (IP) address associated with a destination of the first network traffic data unit.

12. The method of claim 1, wherein the first destination broadcast domain identifier is a virtual local area network (VLAN) identifier associated with a VLAN, wherein each PNI of the set of PNIs is a member PNI associated with the VLAN.

13. The method of claim 1, further comprising:
receiving a third network traffic data unit through a third PNI;
obtaining a second destination network address from the third network traffic data unit;
identifying at least a fourth PNI based on the second destination network address;
rewriting at least a portion of header information belonging to the third network traffic data unit to obtain a fourth network traffic data unit; and
forwarding, through the at least fourth PNI, the fourth network traffic data unit to at least one next hop over the network.

14. A network device, comprising:
a plurality of physical network interfaces (PNI); and
a network processor operatively connected to the plurality of PNIs, and configured to:
receive a first network traffic data unit through a first PNI of the plurality of PNIs;
obtain a first destination network address from the first network traffic data unit;
in response to a PNI through which to forward the first network traffic data unit being unknown to the network device, identify a physical internal loopback port including:
performing, using the first destination network address, at least one lookup to obtain a next hop index;

retrieving next hop information (NHI) mapped to the next hop index, wherein the NHI specifies a group index; and
retrieving the physical internal loopback port using the group index;
further in response to a PNI through which to forward the first network traffic data unit being unknown to the network device, forward the first network traffic data unit through the physical internal loopback port, wherein the physical internal loopback port is operatively connected to the first PNI;
re-receive, after forwarding through the physical internal loopback port, the first network traffic data unit at the first PNI;
identify, from the plurality of PNIs, a set of PNIs using a first destination broadcast domain identifier obtained from the re-received first network traffic data unit;
rewrite a portion of header information belonging to the re-received first network traffic data unit to obtain a second network traffic data unit; and
forward, through the set of PNIs, the second network traffic data unit to a set of next hops over a network.

15. The network device of claim 14, wherein the network processor comprises an ingress processing pipeline (IPP) operatively connected to the first PNI.

16. The network device of claim 15, wherein the network processor further comprises a crossbar fabric operatively connected to the IPP.

17. The network device of claim 16, wherein the physical internal loopback port operatively connects the crossbar fabric to a start of the IPP.

18. The network device of claim 16, wherein the network processor further comprises a set of egress processing pipelines (EPPs) operatively connected to the set of PNIs, respectively, and the crossbar fabric.

19. The network device of claim 18, further comprising:
a computer processor; and
a pipeline configurator executing on the computer processor, and programmed to configure at least the IPP and the set of EPPs.

20. A method for forwarding network traffic, comprising:
receiving a network traffic data unit through a first physical network interface (PNI);
identifying, in response to lacking a MAC address-to-port mapping pertinent to the first network traffic data unit, a physical internal loopback port using a destination network address obtained from the network traffic data unit;
forwarding the network traffic data unit through the physical internal loopback port;
after the forwarding through the physical internal loopback port:
re-receiving the network traffic data unit;
analyzing the re-received network traffic data unit to identifying a destination virtual local area network identifier (DVID);
identifying a set of PNIs using the DVID; and
forwarding, through the set of PNIs, a second network traffic data unit derived from the network traffic data unit.

* * * * *